July 18, 1944. E. F. NELSON 2,353,923
HYDROCARBON CONVERSION
Filed April 27, 1940
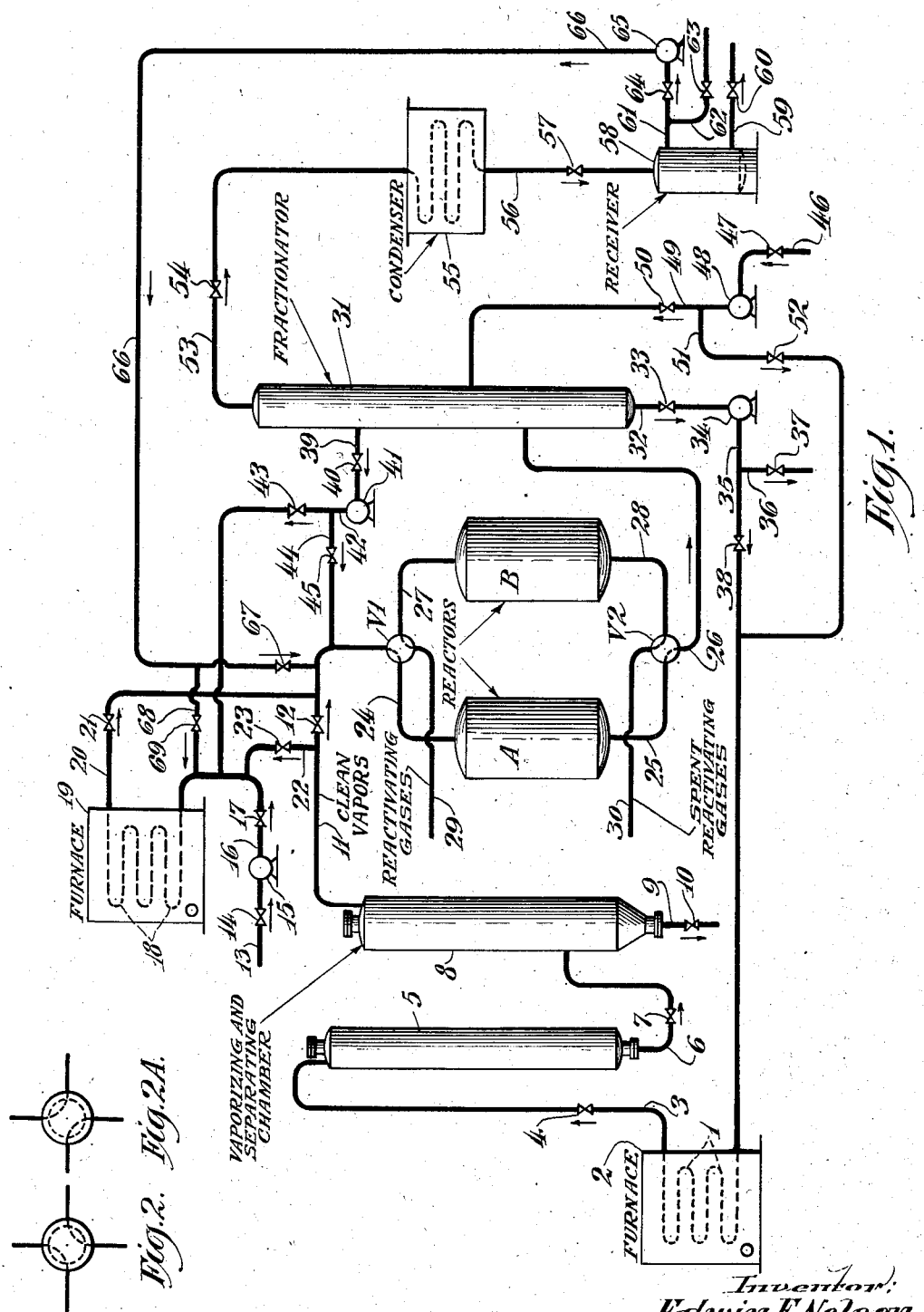
Inventor:
Edwin F. Nelson
By Lee J. Gary
Attorney.

Patented July 18, 1944

2,353,923

UNITED STATES PATENT OFFICE 2,353,923

HYDROCARBON CONVERSION

Edwin F. Nelson, Chicago, Ill., assignor to Universal Oil Products Company, Chicago, Ill., a corporation of Delaware Application April 27, 1940, Serial No. 331,925

4 Claims. (Cl. 196—49)

This is a continuation-in-part of my co-pending application Serial No. 256,633 filed February 16, 1939.

This invention relates to a process for producing gasoline of high octane rating by a combination involving thermal cracking of the charging oil followed by catalytic treatment of the clean vaporous hydrocarbons formed in the thermal cracking treatment. More specifically, the invention provides for passing the stream of vaporous hydrocarbons from the vaporizing and separating chamber of the thermal cracking system in contact with a bed of catalytic material capable of promoting conversion thereof into more desirable hydrocarbons or one capable of substantially desulfurizing said stream of vaporous hydrocarbons.

In my previous application, Serial No. 256,633, I proposed to operate a thermal cracking system under conditions suitable for obtaining charging oil amenable to catalytic cracking preferably with a minimum production of gasoline. A further object of the invention was to produce a hydrocarbon oil charging stock for catalytic cracking which was highly unsaturated, because such materials are particularly well suited for catalytic cracking.

In my present invention the thermal cracking system may be operated to produce either optimum yields of gasoline or minimum yields of gasoline. Where optimum yields are formed in the thermal cracking system, the vapors from the vaporizing and separating chamber are preferably subjected to contact with the bed of catalytic material at a relatively low temperature so as to obtain desulfurization thereof. In such cases, non-condensible gases formed in the process or, when desired, a hydrocarbon oil introduced from an external source may be commingled with the vapors subjected to treatment to supply hydrogen to form hydrogen sulfide from the sulfur which presumably exists as mercaptans, free sulfur, or as sulfur addition products in said vapors.

In another manner of operating the process of the invention, the thermal cracking system may be operated to produce optimum yields of gasoline and the resulting vapors separated in the vaporizing and separating chamber commingled with a relatively light hydrocarbon oil introduced from an external source and/or with non-condensible gases formed in the process and the resulting mixture passed in contact with the bed of catalytic material under selected conditions of temperature and pressure to obtain a gasoline product which is substantially saturated in character. On the other hand, the thermal cracking system may be operated so as to obtain optimum conversion to lighter hydrocarbon oils amenable to catalytic cracking and the vapors separated in the vaporizing and separating chamber commingled with a relatively light hydrocarbon oil introduced from an external source or with non-condensible gases formed in the process, the mixture being subjected to contact with the bed of catalytic material under selected conditions of temperature and pressure so as to obtain a gasoline product which is substantially saturated and having a relatively high octane rating.

The invention, however, is not limited to the use of the light hydrocarbon oil introduced from an external source or to the method which involves the recirculation of the non-condensible gases formed in the process but may employ, for example instead, a relatively light oil separated from the intermediate conversion products or, on the other hand, the relatively clean vapors from the thermal cracking treatment may be subjected to treatment in contact with the bed of catalytic material without the addition of any extraneous material.

In one embodiment the invention may comprise subjecting a relatively heavy oil to thermal cracking treatment in a heating coil and communicating reaction chamber under conditions regulated to effect optimum conversion to gasoline, separating clean vaporous conversion products from non-vaporous liquid residue and recovering the latter, commingling said clean vaporous conversion products with uncondensible gases formed in the process and subjecting the resulting mixture at the temperature obtained by mixing the two streams to contact with a catalyst capable of forming a substantially saturated gasoline from gasoline boiling range hydrocarbons contained in said vapors, fractionating the resulting conversion products to substantially separate fractionated vapors boiling in the range of gasoline from the higher boiling intermediate conversion products and condensing the latter as reflux condensate, commingling said reflux condensate with the charging oil and supplying the mixture to said thermal cracking treatment as said relatively heavy hydrocarbon oil, cooling and condensing said fractionated vapors, separating the resulting distillate and gas, recovering the former, and commingling a portion of said gas as the uncondensible gases with said relatively clean vaporous conversion products.

Figure 1 in the accompanying drawing illustrates diagrammatically in conventional side elevation one specific form of the apparatus which may be used to accomplish the objects of the invention and embodying the principal features above referred to.

Figures 2 and 2A are illustrations of the four-way inlet and outlet valves V1 and V2 diagrammatically indicated in Figure 1. Figure 2 shows the valves in one position while Figure 2A shows the passageways therethrough shifted.

Referring to Figure 1, the reference numeral 1 indicates a heating coil disposed within furnace 2 by means of which the required heat is supplied to the oil introduced in the manner to be described later to bring it to the desired cracking temperature, preferably at a substantially superatmospheric pressure. The temperature and time of contact of the oil in heating coil 1 may be varied over a relatively wide range depending upon the results desired. When optimum conversion into gasoline boiling range hydrocarbons is desired, temperatures within the range of 850 to 1050° F., or more may be employed with a superatmospheric pressure ranging, for example, from 200 to 800 pounds per square inch. On the other hand, when optimum conversion to light oil is desired with a minimum production of gasoline, temperatures may range from 800 to 1100° F., with a superatmospheric pressure of from 100 to 800 pounds or more per square inch.

In any event, the conversion products from heating coil 1 are directed through line 3 and valve 4 to reaction chamber 5 which is preferably operated at a superatmospheric pressure substantially equal to or slightly less than that employed on the outlet of heating coil 1 and wherein appreciable continuous cracking of the conversion products is accomplished. Chamber 5 is preferably insulated to conserve heat, although insulation is not indicated in the drawing.

The vaporous and liquid conversion products pass through substantially the entire length of the reaction chamber and are directed in commingled state from the lower portion of this zone through line 6 and valve 7 to vaporizing and separating chamber 8. Chamber 8 is maintained at a substantially reduced pressure relative to that in chamber 5 which may range, for example, from 50 to 200 pounds or more per square inch by the regulation of valve 7 in line 6 and the reduction in pressure between these two zones is sufficient to effect substantial further vaporization of the liquid conversion products supplied to chamber 8 whereby said liquid conversion products are reduced to a non-vaporous residue of the desired characteristics. Separation of the clean vaporous hydrocarbons and non-vaporous residue is accomplished in chamber 8 and provision is made for removing the residual liquid from the lower portion of this zone through line 9 and valve 10 to cooling and storage or elsewhere as desired.

The relatively clean vaporous hydrocarbons separated in chamber 8 are withdrawn from the upper portion of this zone through line 11 and may be directed all or in part through line 12 to valve V1 after which they are supplied to alternately operated catalytic reactors for further treatment in the manner to be described more fully later. Ordinarily, however, clean vaporous hydrocarbons separated within chamber 8 are below the temperature required to effect their desired catalytic conversion in the alternately operated catalytic reactors and provision is therefore made, in the case here illustrated, for increasing the temperature to the desired degree prior to their introduction to the catalytic reactors by directing the clean vaporous hydrocarbons in line 11 through line 22 and valve 23 into line 16 by means of which they are supplied to heating coil 18. Clean vaporous hydrocarbons supplied to heating coil 18 are raised to the desired temperature by heat supplied from furnace 19 and this temperature may range, for example, from 800 to 1200° F. The heated vapors from heating coil 18 are directed through line 20 and valve 21 back to line 11 by means of which they are supplied to valve V1.

In some cases, and particularly in those where it is desired to obtain either a substantially saturated gasoline from the material subjected to conversion in the catalytic reactors or where it is desired to obtain desulfurization of the vaporous hydrocarbons supplied to the catalytic reactors, a relatively light hydrocarbon oil may be commingled with the vapors subjected to treatment for the purpose of supplying hydrogen to the reactants. The probable reaction involved in the former case being one of hydrogen transfer from the more saturated hydrocarbons to the unsaturated hydrocarbons while the reaction in the latter case probably involves the dehydrogenation of the more saturated molecules, the hydrogen thus evolved being used for producing hydrogen sulfide from the sulfur contained in the sulfur bearing material subjected to conversion. The light hydrocarbon oil introduced from an exterior source for this purpose may comprise, for example, a relatively light gas oil, naphtha, or kerosene which is supplied by way of line 13 and valve 14 to pump 15 which discharges through line 16 and valve 17 into heating coil 18. When an oil from an exterior source is used for the purpose of supplying hydrogen during the desulfurization treatment, preferably only this hydrocarbon oil is heated in heating coil 18 and the resulting heated oil commingled with the vapors in line 11 to form a mixture having a temperature ranging, for example, from 400 to 600° F., the mixture thereafter being subjected to treatment in the manner to be described later.

In another manner of operation, only the oil introduced from an exterior source is subjected to heating in coil 18, after which it is commingled with the clean vapors in line 11 to form a mixture having a temperature ranging, for example, from 600 to 850° C., which is thereafter subjected to treatment in the alternately operated catalytic reactors so as to form a gasoline product which is substantially saturated in character.

Another method of operation may involve commingling uncondensed normally gaseous hydrocarbons formed in the process or light intermediate conversion products with or without additional heating with the vaporous conversion products in line 11, the latter having been heated to a higher temperature in heating coil 18 or with no additional heating and with or without the addition of the light oil introduced from an outside source, all of which will be described more fully later.

In any event, the hydrocarbon reactants supplied to valve V1 are alternately subjected to contact with the catalytic material in reactors A and B, while the catalytic material in reactors A and B is alternately subjected to reactivation. In the case here illustrated, switching of the stream of reactants and reactivating gases from one reactor to the other is accomplished by means of valve V1, while switching of the spent reactivating gases and conversion products is accomplished by means of valve V2. In order to simplify the description without unnecessary complications, each of the switching valves is illustrated as a four-way valve which may be adjusted to either of the positions illustrated in Figures 2 and 2A. When reactor A is on process and the catalytic material in reactor B is undergoing reactivation, valve V1 is adjusted to the position illustrated in Figure 2 and valve V2 is adjusted to the position illustrated in Figure 2A, and when reactor B is on process and the catalytic material in reactor A is undergoing reactivation, valve V1 is adjusted to the position illustrated in Figure 2A and valve V2 to the position illustrated in Figure 2.

When reactor A is on process, reactants supplied to valve V1 pass therethrough into line 24 by means of which they are supplied to reactor A, passing therethrough in contact with the catalytic material disposed therein and the conversion products from reactor A pass through line 25 and valve 26 for treatment in the manner to be described. When reactor B is on process, reactants supplied to valve V1 pass therethrough into line 27 by means of which they are supplied to reactor B and the conversion products from reactor B are directed through line 28 and pass through valve V2 into line 26 for treatment in the manner to be described.

When the catalytic material in reactor B is undergoing reactivation, reactivating gases comprising, for example, combustion gases containing controlled minor amounts of oxygen heated to a temperature ranging from 800 to 1100° F., are supplied to the system by way of line 29, passing through valve V1 into line 27 by means of which they are supplied to reactor B. The carbonaceous materials deposited upon the catalyst during a prior processing period are burned when the reactivating gases are brought in contact therewith and the resulting spent reactivating gases and combustion products are removed from reactor B by way of line 28, passing through valve V2 into line 30, after which they may be disposed of preferably after recovering heat therefrom or, when desired, regulated portions may be recirculated after readjusting the oxygen concentration and temperature thereof as the fresh reactivating gases. When the catalytic material in reactor A is undergoing reactivation, fresh reactivating gases in line 29 pass through valve V1 into line 24 by means of which they are supplied to reactor A and spent reactivating gases and conversion products from reactor A pass through line 25 and valve V2 into line 30 for treatment as previously described.

Reactors A and B, in the case here illustrated, may comprise, for example, suitably insulated chambers containing one or a plurality of beds of the catalytic material wherein the conversion reaction is carried out under substantially adiabatic conditions. When desired, however, other types of reactors well known in the art, may be employed, such as, for example, those which contain a plurality of tubular elements containing the catalytic material and wherein a suitable heat convective medium may be circulated in contact with said tubular elements to supply or withdraw heat therefrom or, on the other hand, reactors A and B may contain a bed of catalytic material in which suitable tubular elements are disposed for the purpose of supplying or withdrawing heat from the bed of said catalytic material.

In view of the above, it is obvious that it is not the intention to limit the invention by employing any specific type of reactor, the invention being limited only with respect to the result to be accomplished.

Catalysts which have been found to be effective in the catalytic cracking and desulfurization treatment of hydrocarbon vapors may comprise pellets or granules of silica or other siliceous and refractory materials composited with compounds selected from the group consisting of alumina, zirconia, vanadia, and thoria. In addition, the hydrosilicates of alumina, acid treated clays, or the like, have also been found to be effective in the treatment above referred to. Although the catalysts above recited are generally considered to be the preferred catalysts, their use is not to be construed as a limiting feature, for various other catalysts well known to those in the art may be employed within the broad scope of the invention.

The conversion temperatures employed in the catalytic treatment, whether it is desired to obtain desulfurization, hydrogen transfer to obtain a substantially saturated gasoline, or catalytic cracking, will fall within the range of 500 to 1200° F. Preferably, however, for desulfurization temperatures of the order of 400 to 600° F., are employed for low temperature treatment, for hydrogen transfer temperatures within the range of 600 to 850° F. are employed, and for high temperature catalytic cracking temperatures within the range of 800 to 1200° F., are employed with a pressure, in any case, ranging, for example, from substantially atmospheric to 200 pounds or more per square inch.

The conversion products in line 26 are supplied to fractionator 31 wherein fractionated vapors boiling substantially in the range of gasoline are substantially separated from the higher boiling conversion products. In the case here illustrated, fractionator 31 is preferably operated at approximately the same pressure as that employed on the outlet of the catalytic reactors. The heavy conversion products separated from the light fractionated vapors in fractionator 31 are condensed therein as reflux condensate and, when desired, a light fraction may be separated therefrom comprising essentially a hydrocarbon oil boiling substantially in the range of a light gas oil, kerosene or naphtha. Heavy reflux condensate separated in fractionator 31 is removed therefrom by way of line 32 and directed through valve 33 to pump 34. Pump 34 discharges through line 35 and, when desired, the heavy reflux condensate may be recovered as a product of the process by way of line 36 and valve 37, in which case only the hydrocarbon oil charging stock supplied in the manner to be described later is subjected to treatment in the manner previously described. Preferably, however, the reflux condensate in line 35 is directed through valve 38 into heating coil 1 for treatment as previously described.

The light fraction separated from the heavier conversion products in fractionator 31, which comprises essentially as above described a light gas oil, naphtha, or kerosene, is removed from fractionator 31 through line 39 and is directed through valve 40 to pump 41. Pump 41 discharges through line 42 and this fraction is preferably directed through valve 43 into line 16 by means of which it is supplied to heating coil 18 wherein it is heated to the desired conversion temperature and thereafter commingled with the relatively clean vaporous conversion products in line 11. Since the light fraction removed from fractionator 31 as above described is a relatively refractory oil, when such oil is used it may be heated to a relatively high temperature in heating coil 18 so that upon mixing with the clean vaporous hydrocarbons in line 11 the desired conversion temperature is obtained prior to the introduction of the mixture to the catalytic reactors, or, when desired, the light oil fraction and the clean vaporous hydrocarbons may both be supplied to heating coil 18 and heated to the desired conversion temperature. In some cases, however, heating of the light fraction from fractionator 31 may not be necessary and in such cases the light oil in line 42 may be directed through line 44 and valve 45 into line 11, commingling therein with the materials to be converted in the catalytic reactors.

Charging oil for the process which may comprise a relatively heavy hydrocarbon oil, such as topped or reduced crude oil or, when desired, crude oil or any desired fraction thereof, is supplied to the system by way of line 46 and is directed through valve 47 to pump 48. Pump 48 discharges through line 49 and when the charging oil contains light hydrocarbons which may boil within the range of the fractionated vapors or within the range of the light hydrocarbon oil, it may be directed through line 50 into fractionator 31 and fractionated therein with the conversion products supplied as previously described. On the other hand, when the charging oil contains only heavy hydrocarbons and particularly in the case where it is desired to recover the heavy reflux condensate from fractionator 31, it is directed through line 51 and valve 52 into line 35 by means of which it is supplied to heating coil 1 for treatment in the manner previously described.

Fractionated vapors separated within fractionator 31 are directed through line 53 and valve 54 to cooling and condensation in condenser 55. Distillate, together with undissolved and uncondensed gases from condenser 55, is directed through line 56 and valve 57 into receiver 58 wherein the distillate and gases are collected and separated. A portion of the distillate collected and separated in receiver 58 may be returned to the upper portion of fractionator 31 by well known means, not shown, as a refluxing and cooling medium therein, while the remaining portion of the distillate in receiver 58 is removed therefrom by way of line 59 and valve 60 and recovered as a product of the process or subjected to any desired further treatment.

Undissolved and uncondensed gases collected and separated in receiver 58 are removed therefrom by way of line 61 and may be directed through line 62 and valve 63 and recovered as a product of the process. However, since these gases contain ordinarily a relatively high proportion of hydrogen and methane whereby they are particularly adaptable for use in the desulfurization treatment of the relatively clean vaporous hydrocarbons or whereby they may be employed for producing a substantially saturated gasoline from said relatively clean vaporous hydrocarbons, at least a portion thereof is preferably directed through valve 64 to compressor 65. Compressor 65 discharges through line 66 and all or a portion of the gases in line 66 may be directed through valve 67 into line 11, commingling therein with the relatively clean vaporous hydrocarbons for treatment in the manner previously described. In some cases, however, since these gases are at a relatively low temperature, it may be desirable to supply heat thereto prior to commingling the same with the vaporous hydrocarbons in line 11, and this may be accomplished by directing them through line 68 and valve 69 into line 16 by means of which they are supplied either alone or in commingled state with either the vaporous hydrocarbons from line 11 and/or with the light oil introduced from an external source and/or with the light oil from fractionator 31 to heating coil 18, and after receiving heat therein subsequently returned to line 11.

Examples of one specific operation of the process as it may be accomplished in an apparatus such as illustrated and above described is approximately as follows:

*Example I*

Heavy reflux condensate formed as hereinafter described is subjected to conversion at a temperature of 920° F., and at a superatmospheric pressure of 200 pounds per square inch in a heating coil and communicating reaction chamber. The conversion products are supplied to a vaporizing and separating chamber operated at a superatmospheric pressure of 75 pounds per square inch wherein relatively clean vaporous hydrocarbons are substantially separated from non-vaporous residue and the latter recovered as a product of the process.

The relatively clean vaporous hydrocarbons separated in the manner above mentioned are commingled with a portion of the uncondensed normally gaseous products separated as hereinafter described and the mixture alternately supplied to catalytic reactors containing a silica-alumina catalyst at a temperature of approximately 550° F., wherein desulfurization of said relatively clean vaporous hydrocarbons is accomplished. Simultaneously with the catalytic treatment in one reactor the catatlytic material contained in the other reactor is subjected to reactivation by passing a stream of oxygen-containing reactivating gases in contact therewith at a temperature of approximately 920° F., to remove by combustion the carbonaceous materials deposited during the prior catalytic treatment of the above mentioned mixture.

The conversion products leaving the catalytic reactor are subjected to fractionation in commingled state with the charging oil, and the latter comprising essentially a 24° A. P. I. gravity Mid-Continent reduced crude oil and fractionated vapors of approximately 400° F. end point is substantially separated from the higher boiling fractions, said higher boiling fractions being condensed as reflux condensate and subjected to treatment in the manner above described.

The fractionated vapors are subjected to cooling and condensation and the resulting distillate and gas collected and separated. The distillate is recovered as a product of the process and a portion of the gases remaining uncondensed and undissolved in the distillate is commingled with the clean vaporous hydrocarbons from the vaporizing and separating chamber as above described.

When employing the conditions above mentioned, approximately 50% of 80 octane number gasoline with a sulfur content below 0.02% and approximately 40% by volume of liquid residue may be obtained as products of the process, the balance being attributed principally to gas and loss.

Example II

Heavy reflux condensate formed as hereinafter described is subjected to conversion at a temperature of 920° F., and at a superatmospheric pressure of 200 pounds per square inch in a heating coil and communicating reaction chamber. The conversion products are supplied to a vaporizing and separating chamber operated at a superatmospheric pressure of 75 pounds per square inch wherein relatively clean vaporous hydrocarbons are substantially separated from non-vaporous residue and the latter recovered as a product of the process.

The relatively clean vaporous hydrocarbons from the vaporizing and separating chamber are commingled with a 36° A. P. I. gravity gas oil fraction heated and vaporized in an external heating coil at a temperature of 950° F., and the mixture at a temperature of 800° F., is alternately supplied to one of two reaction zones containing a silica alumina catalyst. Simultaneously with the catalytic treatment in one reaction zone, the catalytic material contained in the other reactor is subjected to reactivation by passing a stream of oxygen-containing reactivating gases in contact therewith at a temperature of approximately 920° F., to remove by combustion the carbonaceous materials deposited during the prior catalytic treatment of the above mentioned mixture.

The conversion products leaving the catalytic reactor are subjected to fractionation in commingled state with the charging oil, the latter comprising essentially a 24° A. P. I. gravity Mid-Continent reduced crude oil and fractionated vapors of approximately 400° F. end point is substantially separated from the higher boiling fraction, said higher boiling fractions being condensed as reflux condensate and subjected to treatment in the manner above described.

The fractionated vapors are subjected to cooling and condensation and the resulting distillate and gas separately recovered as products of the process.

When employing the conditions above mentioned, approximately 63% of 80 octane number gasoline and 23% of non-vaporous liquid residue may be obtained, the balance being attributed principally to gas and loss.

I claim as my invention:

1. A process for the conversion of hydrocarbon oil which comprises subjecting a charging oil to thermal cracking, separating the resultant cracked products into vapors and residue, subjecting substantially all of the vapors to the action of a cracking catalyst in the presence of hydrocarbon oil, derived from a source independent of the vapors and capable of transferring hydrogen to said vapors, at a temperature of from about 600° to about 850° F., for a time period suitable for producing a substantially olefin-free gasoline.

2. The process of claim 1 further characterized in that the cracking catalyst comprises silica and alumina.

3. The process of claim 1 further characterized in that heat is supplied to said vapors before contacting the latter with the cracking catalyst.

4. A process for the conversion of hydrocarbon oil which comprises subjecting a charging oil to thermal cracking, separating the resultant cracked products into vapors and residue, subjecting substantially all of the vapors to the action of a cracking catalyst in the presence of a hydrocarbon oil, derived from a source independent of the vapors and capable of transferring hydrogen to said vapors, for a time period and at a temperature in excess of 600° F. suitable for producing a substantially olefin-free gasoline.

EDWIN F. NELSON.